Patented Aug. 13, 1929.

1,724,549

UNITED STATES PATENT OFFICE.

THOMAS W. BARTRAM AND WILLIAM C. WELTMAN, OF NITRO, WEST VIRGINIA, ASSIGNORS TO THE RUBBER SERVICE LABORATORIES CO., OF AKRON, OHIO, A CORPORATION OF OHIO.

MANUFACTURE OF XANTHATES.

No Drawing. Application filed June 13, 1928. Serial No. 285,202.

The present invention relates to a method for the stabilization of the sodium salt of ethyl xanthic acid, which is frequently called sodium xanthate, sodium ethyl xanthate or sodium ethyl xanthogenate.

Another object of the present invention is to prevent the shrinking in volume accompanied by the caking and packing of the sodium ethyl xanthate on storage as has heretofore been the case. This in the past has made the taking of the sodium ethyl xanthate from the container very difficult.

In the preparation of sodium xanthate by any of the well known processes, for example by adding slightly more than one molecular proportion (76 parts) of carbon disulfid to approximately one molecular proportion (40 parts) of caustic soda (based on the NaOH content) suspended in approximately one molecular proportion (46 parts) of ethyl alcohol, there is formed approximately one molecular proportion (18 parts) of water as a by-product. The water thus formed attaches itself to the sodium xanthate in the form of water of crystallization. This water of crystallization must necessarily be removed from the crude reaction product if decomposition on standing is to be avoided. On attempting to remove this water of crystallization from the commercial product by heating, there also takes place an approximate 25% decrease in weight of the sodium xanthate, but no increase in the xanthate content of the dried material is shown.

In order to further show the effect of heating hydrated sodium ethyl xanthate containing such by-products as are formed when the purest grade of materials are used the following tests were made.

Samples of hydrated sodium ethyl xanthate having a xanthate content of 79.32% were heated for different periods of time at 50° C. These data are shown in the following table.

| Time of heating. | Xanthate content. |
|---|---|
| Hours | % |
| 40 | 74.38 |
| 64 | 65.66 |
| 88 | 65.06 |
| 112 | 63.85 |
| 136 | 60.41 |

These data show the impracticability of drying hydrated sodium ethyl xanthate.

Inasmuch as the trade can use sodium ethyl xanthate containing water of crystallization and, in fact, prefers to purchase hydrated sodium ethyl xanthate to a more expensive xanthate having a lower xanthate content, for example potassium xanthate, due to the fact that it has practically an equivalent xanthate content and can be bought at a slightly cheaper rate, an effort was made to discover a stabilizing agent for the hereinbefore stated hydrated sodium ethyl xanthate.

Numerous tests were made to show the efficiency of various materials as stabilizing agents to prevent the decomposition of sodium xanthate. Among those materials tried as stabilizing agents were basic, dehydrating and causticizing materials as, for example, sodium carbonate, lime (i. e. calcium hydroxide), and like materials having an hydroxyl ion concentration less than sodium hydroxide so as to minimize the formation of thiocarbonates as an impurity. It is well known that carbon disulfid and sodium hydroxide react in the presence of water to form thiocarbonates, and that the formation of the hereinbefore stated impurities is in direct ratio to the basicity of the hydroxide present.

One form of practicing the invention comprises the addition to the hydrated sodium ethyl xanthate of small proportions of stabilizing agent (approximately 5% to 10% of the total weight), such as for example sodium carbonate, lime, calcium hydroxide and the like after the completion of the reaction. In order to test the efficiency of the stabilizing agents, samples of the sodium ethyl xanthate to which a stabilizing agent had been added were heated for a definite period of time at a temperature of about 50° C. and compared to a sample of sodium ethyl xanthate similarly heated, but to which no stabilizing agent was added. These tests follow.

| Stabilizer | Heating | | Xanthate content | |
|---|---|---|---|---|
| | Time | Temp. | Before heating | After heating |
| | Hours | ° C. | | |
| Sodium carbonate | 24 | 50 | 76.80 | 75.71 |
| Calcium oxide | 130 | 50 | 75.3 | 69.48 |
| Calcium hydroxide | 130 | 50 | 75.3 | 67.49 |
| Filter cel | 130 | 50 | 75.3 | 66.25 |
| Zinc sulfid | 64 | 50 | 79.77 | 65.67 |
| None | 130 | 50 | 75.3 | 63.55 |

As seen from the above data, in the presence of one of the preferred type of stabilizers the decomposition of hydrated sodium xanthate is lessened appreciably, even when heated for so long a period as 130 hours at a temperature of 50° C.

An actual service test of the relative value of sodium carbonate or calcium hydroxide as stabilizers for hydrated sodium xanthate was made using two 200 pound cans of hydrated sodium xanthate, stabilized by the addition thereto, after the completion of the reaction, of approximately 5% to 10% of sodium carbonate and calcium hydroxide respectively. The lids of these two cans were tightly fitted and then six holes punched in the top of each to allow for the passage of the volatile decomposition products. The cans were then allowed to remain in a room kept at a temperature of substantially 25 to 45° C. for thirty days. This should approximate the condition existing in a box-car or warehouse in summer. At the end of this period the material analyzed as follows:

| Sample No. | Stabilizer | % Xanthate content | | |
|---|---|---|---|---|
| | | Original | Final | Loss |
| 1 | Sodium carbonate | 74.55 | 70.69 | 3.86 |
| 2 | Calcium hydroxide | 77.58 | 71.99 | 5.59 |

Another method of carrying out the invention comprises the following: Approximately one molecular proportion (40 parts) of caustic soda (based on its NaOH content) and approximately one molecular proportion (46 parts) of ethyl alcohol are placed in a reactor and approximately 8 to 17 parts of one of my preferred type of stabilizers, such for example as lime and the like, added. Considerable heat is given off by the solution of part of the caustic. The mixture is cooled to a temperature below 25° C., and slightly more than one molecular proportion (76 parts) of carbon disulfid added at a rate that the temperature of the reaction product does not go beyond 35° C., and also so that the amount of carbon disulfid added is not greater than an amount equivalent to the sodium hydroxide in solution. At the end of the reaction, the reactor is opened and the unreacted carbon disulfid allowed to volatilize at room temperature.

As an actual service test of the relative value of adding the stabilizer before or after the reaction, three 200 pound cans of hydrated sodium ethyl xanthate were placed in a room kept at a temperature range of substantially from 25° C. to 50° C. for a month. Two of the cans contained sodium xanthate, stabilized with sodium carbonate and lime respectively after the reaction was completed. The third can contained sodium xanthate to which lime had been added at the start of the operation. The analyses showing the xanthate content of the cans at the end of the test period are given in the following table.

| Can No. | Stabilizer | % Xanthate content | | | % Shrinkage in can |
|---|---|---|---|---|---|
| | | Original | Final | Loss | |
| 1 | Sodium carbonate | 74.55 | 67.1 | 7.45 | 34.0 |
| 2 | Lime (hydrated) | 77.6 | 61.5 | 16.50 | 28.0 |
| 3 | Lime (hydrated) | 79.9 | 75.3 | 4.6 | 16.0 |

As seen from the above table, the most efficient stabilization of hydrated sodium xanthate is obtained by adding a small proportion of one of our preferred type of compounds, for example, lime, to the alcohol, caustic mixture, before adding the carbon disulfid.

The increase in xanthate content of the material prepared by adding lime to the alcohol and caustic mixture at the beginning of the reaction is undoubtedly due in part at least to the causticizing action of the lime on the small quantities of sodium carbonate in the caustic soda employed, as experiments have shown that sodium ethyl xanthate, unlike potassium ethyl xanthate, cannot be prepared from the alkali carbonate. The sodium hydroxide thus formed reacts with the ethyl alcohol and carbon disulfid to form additional sodium ethyl xanthate.

It is also noted that in the presence of lime as a stabilizer, very little shrinkage takes place. If no stabilizer is used, the hydrated sodium ethyl xanthate melts down to a mush.

What is claimed is:

1. A composition of matter comprising sodium ethyl xanthate to which has been added a basic metallic compound as a stabilizing agent.

2. A composition of matter comprising sodium ethyl xanthate to which has been added a dehydrating metallic compound as a stabilizing agent.

3. A composition of matter comprising sodium ethyl xanthate to which has been added a causticizing metallic compound as a stabilizing agent.

4. A composition of matter comprising sodium ethyl xanthate to which has been added a basic, dehydrating and causticizing metallic compound as a stabilizing agent.

5. A composition of matter comprising sodium ethyl xanthate to which has been added thereto lime as a stabilizing agent.

6. A composition of matter comprising sodium ethyl xanthate to which has been added not more than 10% by weight of calcium hydroxide as a stabilizing agent.

7. A composition of matter comprising sodium ethyl xanthate which contains not more than 10% by weight of a basic, dehydrating and causticizing compound as a stabilizing agent.

8. The preparation of sodium ethyl xanthate comprising the reaction between ethyl alcohol sodium hydroxide and carbon disulfid in the presence of another basic metallic compound as a stabilizing agent.

9. The preparation of sodium ethyl xanthate comprising the reaction between ethyl alcohol, sodium hydroxide and carbon disulfid in the presence of another dehydrating metallic compound as a stabilizing agent.

10. The preparation of sodium ethyl xanthate comprising the reaction between ethyl alcohol, sodium hydroxide and carbon disulfid in the presence of a causticizing metallic compound as a stabilizing agent.

11. The preparation of sodium ethyl xanthate comprising the reaction between ethyl alcohol, sodium hydroxide and carbon disulfid in the presence of another basic and dehydrating metallic compound as a stabilizing agent.

12. The preparation of sodium ethyl xanthate comprising the reaction between ethyl alcohol, sodium hydroxide and carbon disulfid in the presence of lime as a stabilizing agent.

In testimony whereof we hereunto affix our signatures.

THOMAS W. BARTRAM.
WILLIAM C. WELTMAN.